Aug. 9, 1932.  C. R. SCHOEL  1,870,654
DOUGH DISPENSING DEVICE
Filed June 18, 1931    2 Sheets-Sheet 2
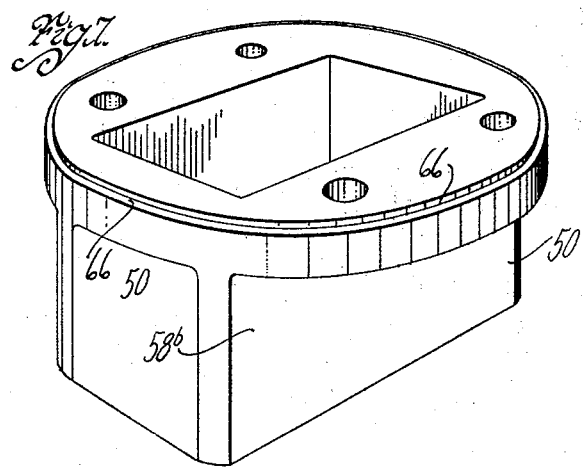
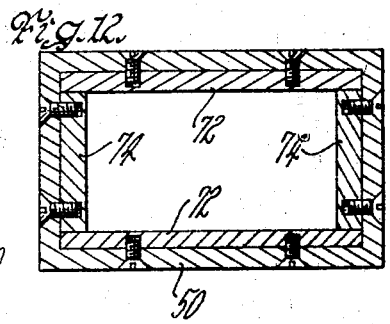
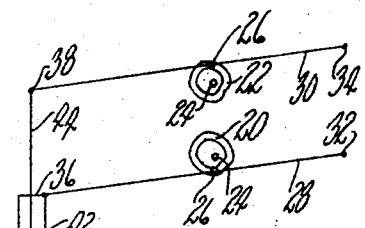
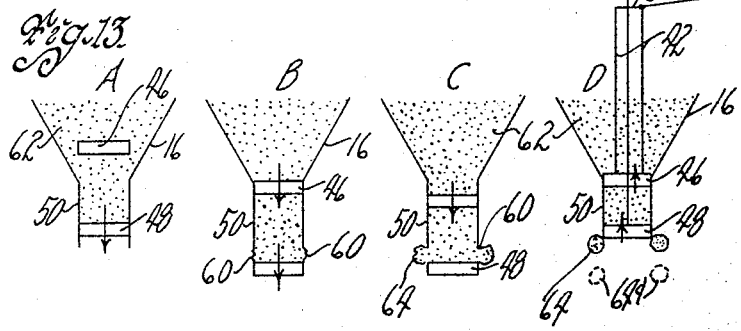
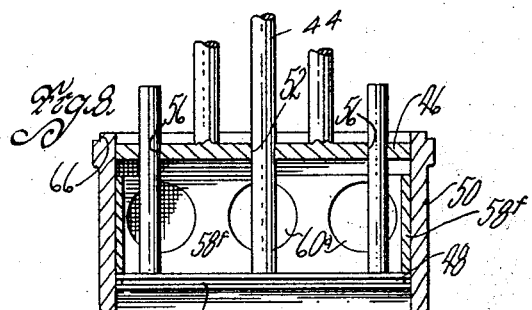
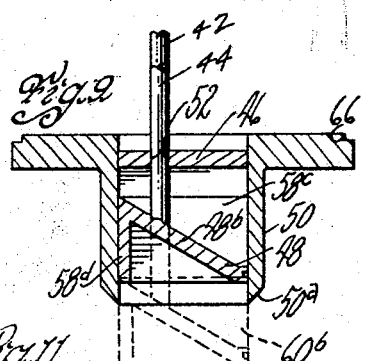
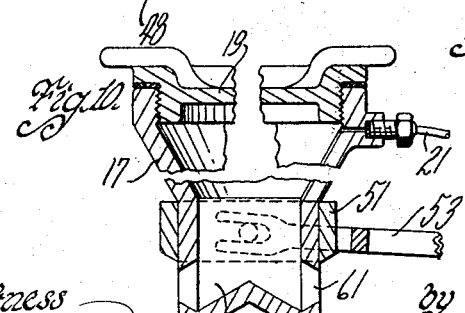
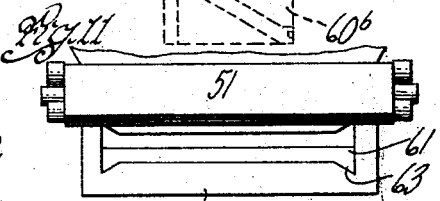

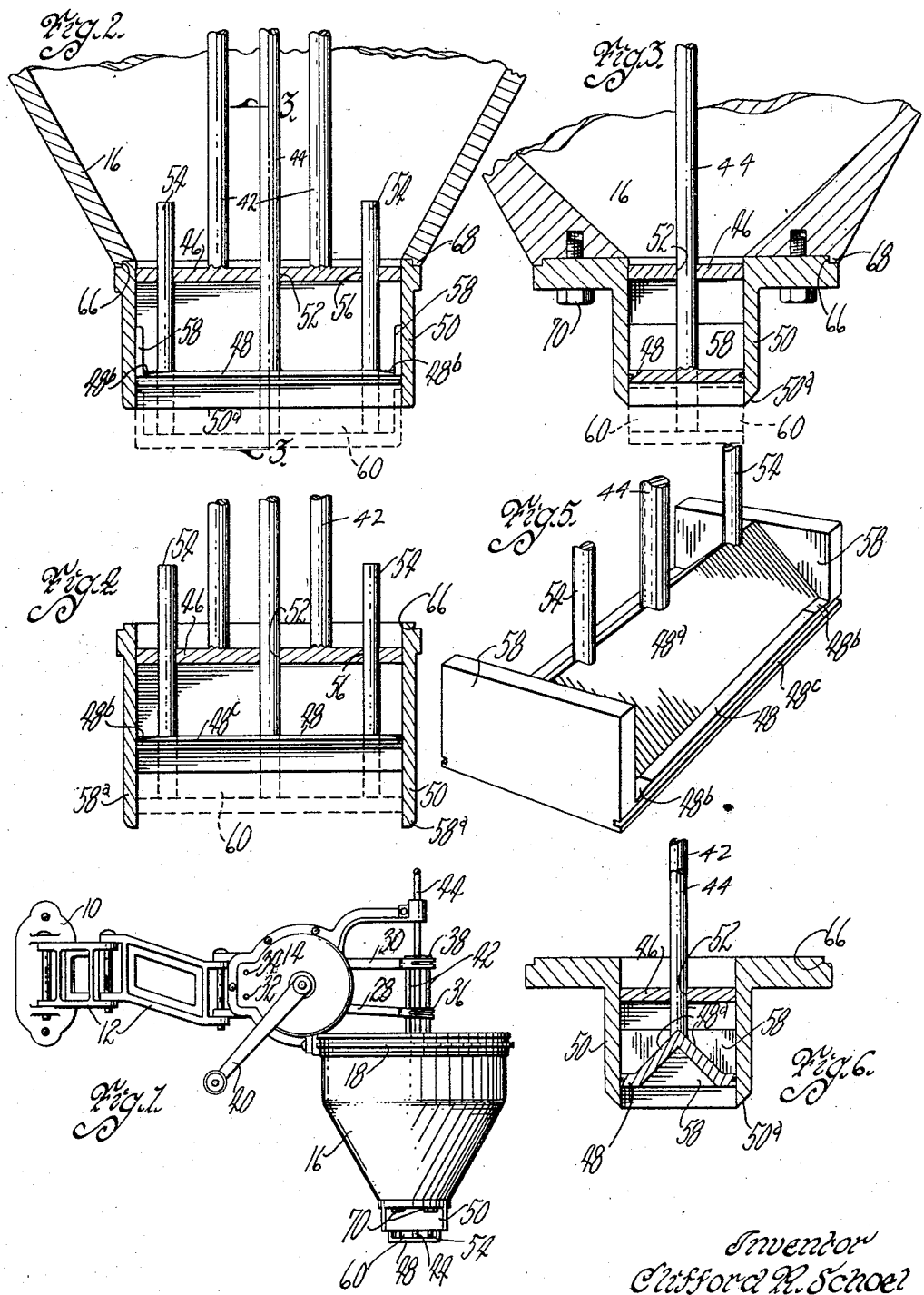

Patented Aug. 9, 1932

1,870,654

UNITED STATES PATENT OFFICE

CLIFFORD R. SCHOEL, OF WATERLOO, IOWA, ASSIGNOR TO GEM DOUGHNUT MACHINE CO., INC., OF WATERLOO, IOWA, A CORPORATION

DOUGH DISPENSING DEVICE

Application filed June 18, 1931. Serial No. 545,158.

An object of my present invention is to provide a dough dispensing device of simple, durable and inexpensive construction from which "non-continuous" pieces of dough may be dispensed.

A further object is to provide means for dispensing non-continuous pieces of dough from dough dispensing machines, such as that shown in the patent of Fred L. Schoel, No. 1,811,564, dated June 23rd, 1931.

In the patent just mentioned a circular cylinder and circular discharge and cut-off plungers are illustrated which, during operation, dispense "continuous" pieces of dough so that doughnuts can be made by such a machine. The doughnuts of course, are round but can be made square or any other desired shape by shaping the cylinder and plungers accordingly.

The main object of my invention is to provide a dough dispensing device having essentially a cylinder and a cut-off plunger which are so constructed that non-continuous pieces of dough can be dispensed, the device being applicable to use on the machine illustrated in the patent referred to.

Particularly, it is my object to provide a cylinder and a cut-off plunger relatively movable, with means for closing off a portion of the dispensing opening which is formed between the cut-off plunger and the cut-off end of the cylinder when the plunger is moved to a position beyond such cut-off end whereby to cause the dispensation of one or more non-continuous pieces of dough.

Still a further object is to provide a means for closing off a portion of the dispensing opening in the form of a shield which may be formed either on the cut-off plunger or on the cylinder and can be made so as to close off either a single portion or a plurality of portions as desired.

With these and other objects in view my invention consists in the construction, arrangement and combination of the various parts of my device, whereby the objects contemplated are attained, as hereinafter more fully set forth, pointed out in my claims and illustrated in the accompanying drawings, in which:

Figure 1 is a side elevation of a dough dispensing machine such as illustrated in the patent referred to, showing my cylinder and cut-off plunger connected therewith for dispensing non-continuous pieces of dough.

Figure 2 is an enlarged vertical sectional view through the lower end of the dough hopper and the cylinder showing the dispensing plunger therein and also a dough discharge plunger.

Figure 3 is a sectional view on the line 3—3 of Figure 2.

Figure 4 is a sectional view similar to Figure 2 showing the closing off shield formed on the cylinder instead of on the plunger as in Figure 2.

Figure 5 is a perspective view of a cut-off plunger of slightly modified construction when compared with the plunger in Figure 2.

Figure 6 is a sectional view similar to Figure 3 showing the plunger in Figure 5 associated therewith.

Figure 7 is a perspective view of a cylinder or "die" as they are ordinarily called, used in Figures 1, 2, 3, 5 and 6, from which non-continuous pieces of dough may be dispensed.

Figure 8 is a sectional view similar to Figure 2 showing a device from which non-continuous pieces of dough in the form of balls may be dispensed.

Figure 9 is a sectional view similar to Figure 6 showing a modified form of cut-off plunger from which only one non-continuous piece of dough may be dispensed.

Figure 10 is a sectional view similar to Figure 6 showing a movable cylinder instead of a movable plunger.

Figure 11 is a side elevation of Figure 10.

Figure 12 is a horizontal sectional view through a die showing a means for adjusting its size; and Figure 13 is a diagrammatic view showing the successive steps in the operation of the dough dispensing device.

On the accompanying drawings I have used the reference numeral 10 to indicate a supporting bracket which may be secured to a wall or the like. Supporting arms 12 extend therefrom for supporting a cam housing 14. The arrangement of the arms 12 and the pivotal connections to each other and to the housing 14 permit manipulation of the housing to various positions over a vat of hot grease so that dough can be dispensed from a hopper 16 into the grease.

The hopper 16 is removably supported with respect to the housing 14 on a band 18. Within the housing 14 cams 20 and 22 are secured to a shaft 24. These cams are shown on the drawings only in Figure 13. The grooves of the cams 20 and 22 coact with rollers 26 which are journalled on arms 28 and 30. The arms 28 and 30 are pivoted at 32 and 34.

Blocks 36 and 38 are provided with pins with which slots of the arms 28 and 30 coact for imparting vertical reciprocating movement to the blocks 36 and 38, whenever the shaft 24 is rotated by a crank 40. The block 36 is connected with rods 42 while the block 38 is connected with a rod 44.

The foregoing description is fully described in the patent referred to, and forms no part of my present invention.

Cut-off and discharge plungers 46 and 48 are connected with the rods 42 and 44 respectively. The discharge and cut-off plungers are adapted to travel through and beyond the upper and lower ends respectively of a cylinder 50. The lower end of the cylinder 50 constitutes a cut-off end.

It will be noted that the plungers 46 and 48 are rectangular in shape. Due to their length and to the fact that they travel beyond the ends of the cylinder 50, I provide guide means (in addition to the rod 44, which slidably extends through a central opening 52 of the plunger 46) for guiding the plungers relative to each other. The additional guide means consists of rods 54 rigidly connected with the cut-off plunger 48 and slidably extended through openings 56 of the discharge plunger.

As shown in Figure 2 I provide shields 58 which close off the ends of a discharging opening 60 which is formed between the cut-off plunger 48 and the lower or cut-off end of the cylinder 50 when the plunger 48 assumes the dotted line position shown in Figure 2. These openings are also indicated at 60 in Figure 3.

Referring to the diagrammatic Figure 13, detail "A" shows the dough, indicated at 62, flowing in between the plungers 46 and 48. In detail "B" the openings 60 are indicated through which non-continuous pieces of dough are to be dispensed. In detail "C", because of the plunger 48 remaining stationary and the plunger 46 continuing to move downwardly, the dough is dispensed as at 62. There is a dwell on the cam 20 for holding the plunger 48 in this stationary position while when the parts are in the position of detail "A", a dwell on the cam 22 holds the plunger 46 in stationary position. In detail "D" the pieces of dough 64 are being cut off at the cut-off end of the cylinder 50, because of upward movement of the cut-off plunger 48 and drop as indicated at 64a into the vat of hot grease. (Not shown.)

It will be obvious that the shields 58, when the plunger 48 is down, have closed off the ends of the cylinder 50 so that a pair of non-continuous pieces of dough have been dispensed, while if the shields 58 were not provided, a rectangularly shaped doughnut would be dispensed. There are other ways of causing the pieces of dough to be non-continuous such as shield extensions 58a on the lower end of the cylinder 50 as illustrated in Figure 4. As shown by the dotted line positions, the dispensing openings 60 are formed whenever the cut-off plunger 48 is in lowered position. It will thus be obvious that the means for closing off a portion of the dispensing opening may be formed either on the cylinder or on the cut-off plunger.

The use of the dispensing plunger 46 provides one way for discharging the dough as in detail "C" of Figure 13 although it will be obvious that the cut-off plunger and the sheild 58 or 58a may be used with any other mechanism for forcing the dough out through the dispensing opening 60 when the plunger 48 is in lowered position.

In the operation of the dough dispensing device I have found that there is a tendency for the non-continuous pieces of dough to become pointed on the ends after they are fried. To overcome this I have provided for enlarging the dispensing openings adjacent the ends, so that a slight additional amount of dough will be dispensed at the ends of the piece of dough so that the ends after fried are hemi-spherical. It will be noted in Figures 2 and 5 that slight depressions are cut in the cut-off plunger 48 at 48b. This allows for the slight additional dispensation of dough and the same result may be accomplished by notching the lower cut-off end 50a of the cylinder 50 if desired. In Figure 4, the cut-off plunger 48 is likewise depressed at 48b. A groove 48c is formed along the edges of the plunger 48 which fills with dough to act as a packing at this particular point.

In Figure 5 I have shown an upwardly depressed central portion 48a for the plunger 48. The surface of the portion 48a deflects the dough toward the dispensing openings 60 and prevents an accumulation of dough adjacent the center of the plunger. In Figure 8 I have shown the plunger 48 with 4 shields 58f.

Openings 60a extend through the shields 58f and dough may be dispensed therethrough in the form of balls. The material of the side shields 58f between the openings 60a serves as the shielding means to close off the cylinder in a manner similar to the shields 58 and thus make the pieces of dough being dispensed non-continuous. The lower edges of the openings 60a constitute cut-off ends in conjunction with the cylinder 50.

In Figure 9 I have illustrated a piston 48b having a wall 58c for closing off the end of the cylinder 50 and a wall 58d for closing off one side thereof so that there is a dispensing opening 60b formed at one side only of the cylinder so that a single non-continuous piece of dough is dispensed in this form of the invention instead of a pair of such pieces such as in Figure 2. The rods 42 and 44 may be offset from the center of the cylinder to eliminate possible distortion of the piece of dough because of the dough flowing around the rods and coming together as it is being discharged from the dispensing opening.

It will be noted that the cylinders 50 have annular shoulders 66 and that the opening 16 has an annular shoulder 68 whereby to securely position the cylinder with respect to the inner surface of the opening. Cap screws 70 are provided for detachably holding the cylinder 50 on the opening 16. By this arrangement, cylinders and plungers of different sizes and shapes may be substituted on the dough dispensing machine as desired. It will further be obvious that instead of moving the plunger 48, the cylinder 50 can be moved for obtaining the same result.

In Figures 10 and 11 I have shown such an arrangement. A hopper 17 is provided having a tubular cut-off plunger 49. The plunger 49 is surrounded by a cylinder 51 which may be reciprocated vertically by a forked arm 53. The hopper 17 has a sealed cover 19 and pressure is imposed on the dough in the hopper through the medium of a compressed air connection 21. In this type of a device, either the openings 60a may be provided in the sides of the cut-off plunger 49 or elongated openings 61 may be provided. Enlargements at 63 provide for the extra dough at the ends of the sticks of dough, these notches corresponding to the notches 48b of the plungers 48.

In this type of device, as in the ones already described, the cut-off plunger 49 and the cylinder 51 are relatively movable and dispensing openings are provided through which the dough is discharged and then cut-off by the movement of the cylinder relative to the plunger.

In Figure 12, I have shown a means for varying the size of the cylinder 50 without having to change the entire die as illustrated in Figure 7. The cylinder opening is reduced in size by removable plates 72 and 74. The plates 74 may be replaced with thicker ones when the length of the pieces of dough are to be reduced and vice versa. The plungers, of course, must be replaced by others of different length when the plates 74 are replaced.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a dough dispensing device, a hopper, a rectangular cylinder and a cut-off plunger relatively movable for dispensing dough therefrom, said cylinder having an open end through which dough may be discharged, the cut-off end of said cylinder continuously co-operating with two opposite sides of said cut-off plunger and intermittently cooperating with the other two sides thereof to cut off a pair of non-continuous pieces of dough from the dough being discharged through said open end.

2. In a dough dispensing device, a hopper, a rectangular cylinder and a cut-off plunger relatively movable for dispensing dough therefrom, said cylinder and plunger, when in one position, forming an opening through which dough may be discharged, the ends of said opening being enlarged, the cut-off end of said cylinder cooperating with said cut-off plunger to cut off a straight, non-continuous piece of dough from the dough being discharged through said opening.

3. In a dough dispensing device, a rectangular cylinder and a cut-off plunger relatively movable for dispensing pieces of dough, said cylinder having a cut-off end, said cut-off plunger being adapted to successively assume a dispensing position within the cylinder, a dispensing position spaced beyond the cut-off end thereof whereby a dispensing opening is formed between the cut-off plunger and said cut-off end and a cut-off position at said cut-off end for cutting off a pair of pieces of dough at opposite sides of said cylinder and a pair of means for closing off a portion of said dispensing opening whereby to cause dispensation of a pair of non-continuous pieces of dough therefrom, the ends of said dispensing openings being enlarged.

4. In a dough dispensing device, a hopper, a rectangular cylinder and a cut-off plunger relatively movable for dispensing dough therefrom, said cylinder having an open end through which dough may be discharged, the cut-off end of said cylinder continuously co-operating with two opposite sides of said cut-off plunger and intermittently cooperating with another side thereof to cut off a straight non-continuous piece of dough from the dough being discharged through said open end.

Des Moines, Iowa, June 1st, 1931.

CLIFFORD R. SCHOEL.